United States Patent

Wahnschaff

[15] 3,688,622
[45] Sept. 5, 1972

[54] DIE CUTTING APPARATUS
[72] Inventor: Paul Wahnschaff, Tucker, Ga.
[73] Assignee: Norcross Engineering Company, Norcross, Ga.
[22] Filed: Sept. 29, 1970
[21] Appl. No.: 76,533

[52] U.S. Cl. ....................83/88, 72/132, 83/436, 83/649
[51] Int. Cl. ....................B26d 7/06, B21f 11/00
[58] Field of Search ..........29/564; 72/132, 164, 183; 93/1 G, 8 W, 36 A; 162/271; 83/88

[56] References Cited

UNITED STATES PATENTS 3,393,547  7/1968  Kortan..........................72/132
2,432,828  12/1947  Stone...........................72/183
2,006,087  6/1935  Miller..........................72/183

Primary Examiner—Charles W. Lanham
Assistant Examiner—R. M. Rogers
Attorney—Jones & Thomas

[57] ABSTRACT

A die cutting apparatus in which a continuous web of material is fed continuously from a supply of the web, the web is decurled and aligned with a die. The web is fed to the die by an intermittent feed mechanism, and loop control means are provided to allow the transition from continuous to intermittent feeding. An outfeed device is provided to remove cut pieces very rapidly, and stack the cut pieces for subsequent removal.

2 Claims, 8 Drawing Figures

INVENTOR
PAUL WAHNSCHAFF

BY Jones & Thomas
ATTORNEYS

DIE CUTTING APPARATUS

BACKGROUND OF THE INVENTION

This invention relates generally to a die cutting apparatus, and is more particularly concerned with an apparatus for the die cutting of various shapes from a web of material at high speed, and including means for controlling the web as it enters the die cutting mechanism and means for removing the cut pieces from the die cutting mechanism.

It is frequently necessary to cut pieces of any given shape from a web of material, and one of the most frequent methods for cutting such pieces is by use of a die cutting mechanism using possibly, but not necessarily, a steel rule die. Generally, steel rule dies are of two basic types: closed die and open die. For the closed die there is a minimum problem of control of the web since the die makes a complete cut on each stamping operation so registration is relatively insignificant; however, on an open die, the front edge of the die must finish a cut in the material that was started by the rear edge of the die. It is therefore seen that proper alignment or registration of the die with the material is extremely important when using an open die.

The registration problem is increased by the fact that a die cutting mechanism is inherently an intermittent operation and must include an intermittent feed, whereas the normal web to be fed into the die cutting mechanism is provided continuously from a roll of the stock. Since the stock is provided in rolls, the roll is rotated continuously to provide a constant supply of the web. This web must be treated to remove the tendency to curl in order to facilitate handling of the web, and the continuous motion of the web from the roll must be translated into an intermittent motion to provide the appropriate feed for the die cutting mechanism.

Further, the die cutting mechanism will discharge the cut pieces in an intermittent fashion, but intermittent retrieval mechanisms are generally expensive, quite complicated, and frequently relatively slow in their operation.

It will be realized by those skilled in the art that two of the primary factors that allow accurate placement of the web material under the die are prevention of excess material available to the intermittent feed mechanism which will cause rather severe vibration of the web so that the web becomes almost totally uncontrollable, and the lack of sufficient web material available to the intermittent feed mechanism so that the web is not fed fast enough, but is held back from the intermittent feed mechanism.

The discharge of the cut pieces is equally important since, if the piece is not discharged from the die cutting area, there will be overstamping of a cut piece which will both mutilate a cut piece and prevent proper cutting of the subsequent piece. Therefore, for rapid operation of such a die cutting apparatus, the pieces must be removed rapidly which is difficult with an intermittently operating discharge mechanism as well as excessively expensive.

SUMMARY OF THE INVENTION

The present invention provides a die cutting apparatus that solves the above mentioned and other problems in that web is fed continuously from the roll of the web stock, decurled, and the web is held under good control from the continuous feed device and into the intermittent feed device on the die cutting apparatus. Control means to synchronize the continuous feed apparatus with the intermittent feed apparatus assures that a sufficient supply of the web will always be available to the intermittent feed apparatus but there will never be an excess of the web fed by the continuous feed apparatus. This latter feature is facilitated by the use of loop control means that adequately controls the web while making available to the intermittent feed mechanism a slight additional amount of web. This feed mechanism for the web is such that very accurate placement of the web beneath the die proper is possible, and lateral control means for accurate placement of the web laterally with respect to the die is also provided.

On the discharge side of the die cutting apparatus, an extremely simple, continuously operated means is provided to receive cut pieces as they are discharged from the die cutting apparatus, and the cut pieces are laid in such fashion that they are very easy to handle further for final stripping, packing and the like.

Due to the accurate placement of the web under the die, it is possible to use either an open or a closed steel rule die; and, the piece to be cut can be of a very short length such as a narrow strip, or a very great length. Regardless of the length, the pieces are properly placed and properly received by the discharge mechanism.

These and other features of the present invention will become apparent from consideration of the following specification when taken into conjunction with the accompanying drawings.

DESCRIPTION OF AN EMBODIMENT

Figure 1A:
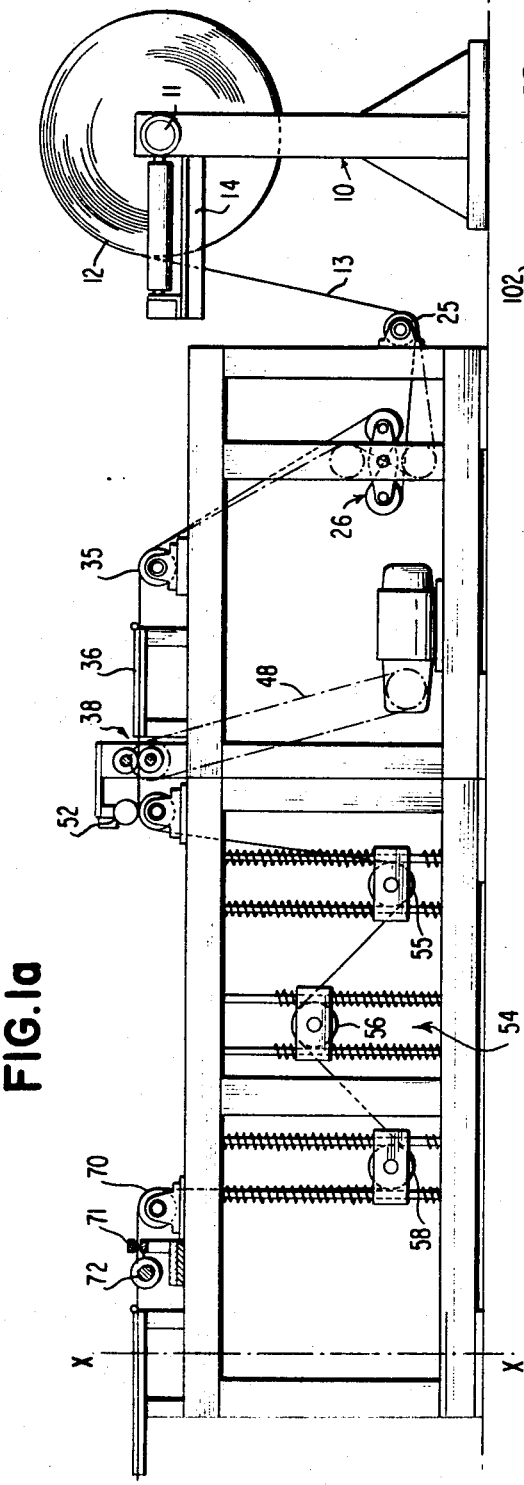
FIGS. 1a and 1b show a side elevational view of a machine made in accordance with the present invention.

Referring now more specifically to the drawings, and to that embodiment of the invention here chosen by way of illustration, it will be seen in FIG. 1 that there is a web delivery means 10 having a brake 11 to prevent free rotation of the shaft on which the roll of web 12 is mounted. This piece of equipment is conventional, and those skilled in the art will understand the construction.

Figure 2:
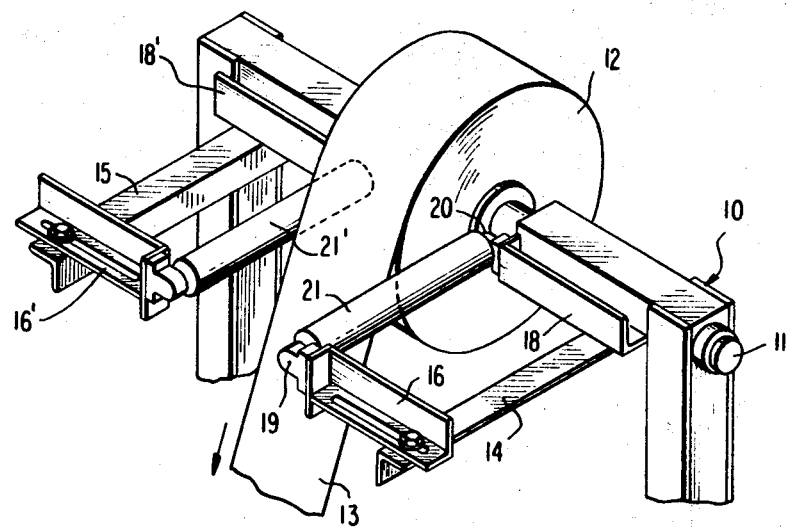
FIG. 2 is a fragmentary perspective view showing the guide rolls for the web supply.

Attached to stanchions of the delivery means 10, there is a pair of forwardly extending arms 14 and 15 which will be seen also in FIG. 2 of the drawings. Slidably attached to the arm 14, and perpendicularly disposed thereto is a pair of bearing supports 16 and 18 having bearings 19 and 20 mounted on the extending ends thereof. Supported between the bearings 19 and 20 there is a guide roll 21.

The arm 15 also carries bearing support members such as those supported by the arm 14, the construction being the same as that just described, and the primes of the numerals are used.

It will now be seen that, due to the slidable attachment of the bearing supports 16 and 18 with the arm 14, the guide roll 21 can be moved laterally with respect to the delivery means 10. The guide rolls 21 and 21' should preferably be disposed along the radius of the roll of web 12 and lightly in engagement with the side of the roll 12. With this arrangement, it will be seen that the tendency of a large roll of web to telescope will be checked so that the web 13 coming from the roll 12 will always be accurately located transversely of the machine.

Figure 3:
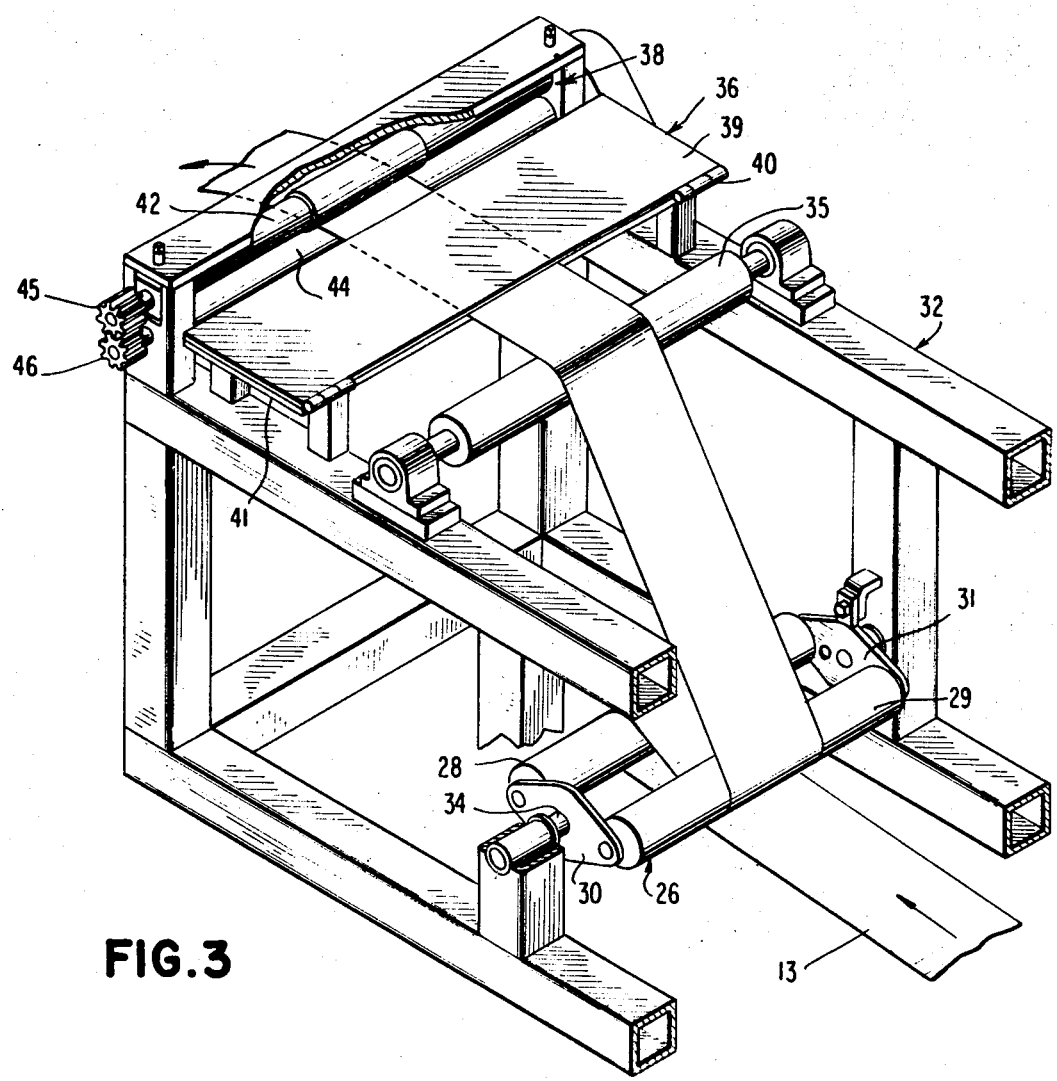
FIG. 3 is a perspective view showing the decurl rolls and the continuous feed rolls.
Figure 4:
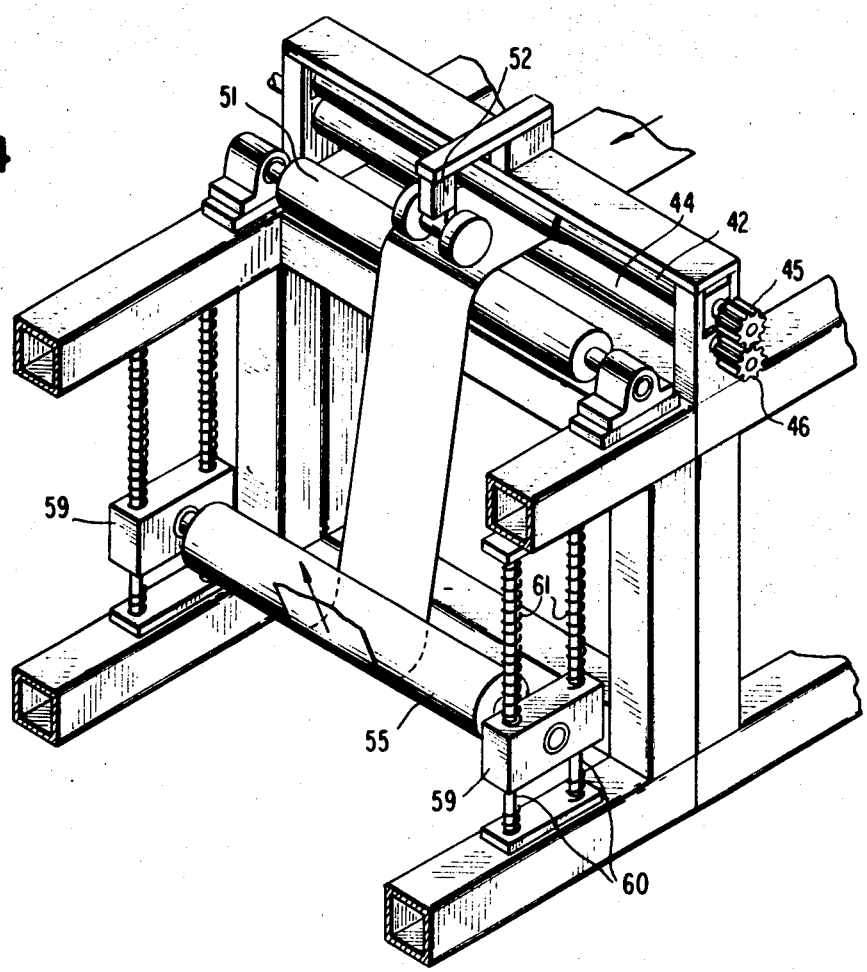
FIG. 4 is a perspective view showing the continuous feed rolls and a portion of the loop control means.
Figure 5:
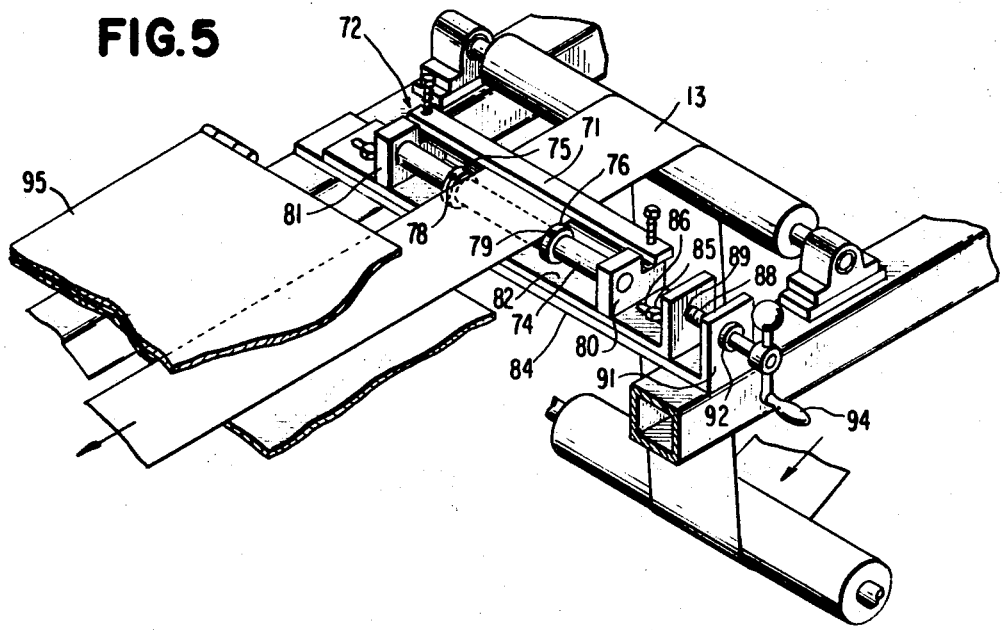
FIG. 5 is a perspective view showing the lateral control means for the web.

From the roll 12, the web 13 passes over a roller 25 and goes directly to the decurl roll generally indicated at 26. The decurl rolls 26 are better shown in FIG. 3 of the drawings and include a pair of rolls 28 and 29 which are rotatably mounted between plates 30 and 31. The plates 30 and 31 are rotatably carried by the frame 32 by means of stub shaft 34.

It will thus be seen that the decurl rolls 28 and 29 can be disposed at various positioned with respect to the frame 32 by rotating the plates 30 and 31 with respect to the frame. By this means, the amount of decurl of the web 13 can be varied to accommodate different thicknesses and densities of materials as well as to accommodate the difference in curl encountered in the outermost layers of a roll 12 of web 13 and the innermost layers of the roll 12.

From the decurl rolls 26 the web extends upwardly and forwardly of frame 32 and over a roll 35 which serves only to guide the web 13 into a drag plate 36, then to the continuous feed rolls 38.

The drag plate 36 includes simply a plate 39 attached by hinges 40 to a stationary plate 41. The plate 39 can be raised in order to feed the web 13 through the machine, but will then be lowered to lie parallel with the plate 41 so that the weight of the plate 39 will be resting on the web 13 to give a braking effect to the web 13.

The continuous feed rolls 38 include a pair of parallel rolls 42 and 44 which are tied together by means of gears 45 and 46 on one end of the rolls 42 and 44 respectively. The roll 44 is driven by means of a chain 48, the chain 48 being driven from a drive motor 49 with an appropriate gear reducer 50.

It will be seen thus far that the motor 49, through the gear reducer 50 and chain 48 will drive the continuous feed roll 44, and the roll 44 will drive, through the gears 46 and 45 the upper feed roll 42. The web 13 will be disposed between the two continuous feed rolls 42 and 44 and will pull the web continuously. The drag plate 36 maintains control of the web immediately before the web enters the continuous feed rolls 38. The brake 11 on the feeding apparatus 10 prevents over running of the roll of web 12 so that the web 13 is held taut as it passes over the decurled rolls 26.

It will thus be seen that there is a continuous feeding mechanism provided in which a web is pulled from a roll, and is decurled, and is moved through continuous feeding means.

As the web 13 exits from the continuous feeding rolls 38, the web 13 passes over a roll 51 which has a metering device 52 riding thereagainst. The metering device 52 is simply a linear counter to allow accurate measure of the amount of web that passes through the machine.

From the roll 51, the web 13 goes into the loop control means generally designated at 54. The loop control means here shown includes three dancer rolls 55, 56 and 58. The dancer roll 55 is mounted between bearings 59, the bearings 59 being vertically slidable on rods 60 having springs 61 surrounding the rods. The springs 61 are so arranged that the bearing 59 will normally remain close to the bottom of the frame 32, but so that only a small force is required to cause the bearing 59 to slide vertically along the rod 60 to move upwardly with respect to the frame 32.

The dancer roll 56 is arranged similarly to the roll 55, with bearings 62 slidable on rods 64, the rods 64 having springs 65 therearound. The roll 56 is biased by the springs 65 to remain towards the upper part of the frame 32, with only a small force being required to cause the roll 56 to move downwardly with respect to the frame 32.

The roll 58 is arranged exactly as is the roll 55, having bearings 65 slidable on rod 66, the rod 66 having springs 68 there-around. The roll 58, as is the roll 55, is biased towards the lower portion of the frame 32.

The use of this loop control means 54 will be discussed in more detail hereinafter.

From the loop control means 54, the web 13 passes over a guide roll 70, and passes through a slotted hold down 71, then through a lateral alignment means 72. The lateral alignment means 72 is shown in more detail in FIG. 6 and includes a rod 74 having a pair of collars 75 and 76 adjustably mounted thereon. The collars 75 and 76 can be moved along the rod 74 and can be fixed in place by means such as the set screws 78 and 79.

The rod 74 is fixed in end blocks 80 and 81, the blocks 80 and 81 being fastened to a plate 82. The plate 82 is mounted on a base plate 84 by means of bolts or the like 85 fixed in the base plate 84 and passing through slots 86 in the plate 82. It will thus be seen that the plate 82 can move transversely with respect to the frame 32 to the extent allowed by the length of the slots 86. To move the plate 82 with respect to the base plate 84, there is provided a threaded shaft 88 received within a threaded hole 89 in an upstanding flange 90, the upstanding flange 90 being rigidly attached to the plate 82. The threaded shaft 88 passes through a flange 91 that is attached to the base plate 84, and collars, such as collar 92, are mounted on each side of the flange 91 to prevent transverse motion of the shaft 88 with respect to the flange 91. A crank handle 94 is provided for convenience.

It will now be seen that, by rotation of the crank 94, the shaft 88 will be rotated to cause the flange 90 to move towards or way from the flange 91 thereby to move the plate 82 with respect to the base plate 84. This will move the entire alignment means including the end blocks 80 and 81 with the shaft 74 and its collars 75 and 76.

Figure 6:
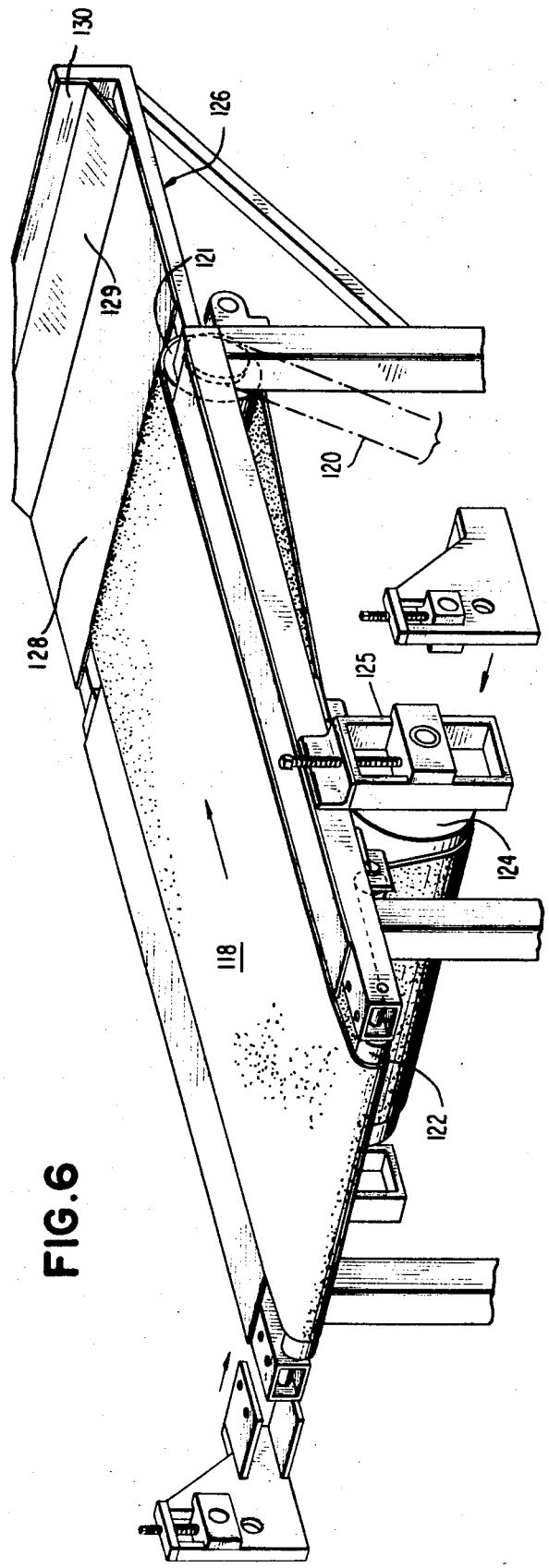
FIG. 6 is a perspective view showing the discharge mechanism.

The web 13, as will be seen in FIG. 6, passes above the shaft 74 and will remain between the collars 75 and 76. The web 13 is prevented from moving vertically to rise over the collars 75 or 76 by the slotted hold down 71.

The web 13 now passes through another drag plate 95 which gives better control of the web in this vicinity.

From the drag plate 95, the web 13 moves into the intermittent feed rolls 96 which are here shown only schematically since they are an integral part of the punch press 98 which is a conventional piece of equipment and will be understood by those skilled in the art without a detailed description.

For purposes of describing the present invention, it will be understood that the punch press 98 includes a vertically reciprocable plate 99 to carry a die 100, and a stationary platent 101. A drive motor 102 drives the plate 99 as well as the intermittent drive means 104, the intermittent drive means 104 in turn driving the intermittent feed rolls 96.

It will be understood that the web 13 is fed beneath the die 100 by the intermittent feed rolls 96, the intermittent feed rolls 96 pulling the web 13 through the drag plate 95 from the loop control means 54. Thus, the web 13 is moved in intermittent fashion from the loop control means 54 and is moved continuously into the loop control means 54.

In use, it is contemplated that the die 100 will always have its forward edge the same distance from the forward edge of the movable plate 99; therefore, regardless of the length of the piece to be cut by the die 100, the leading edge of the cut piece will always be at the same location to be received by the out-feed device 110.

Figure 1B:
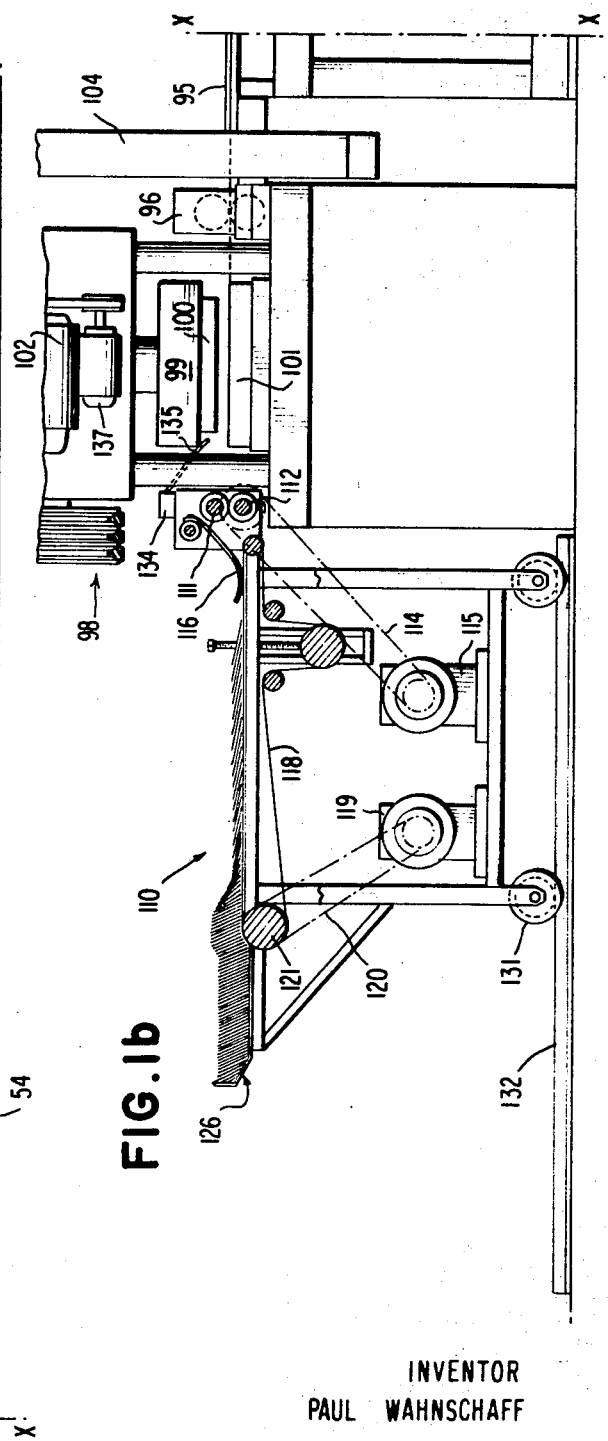
Figure 7:
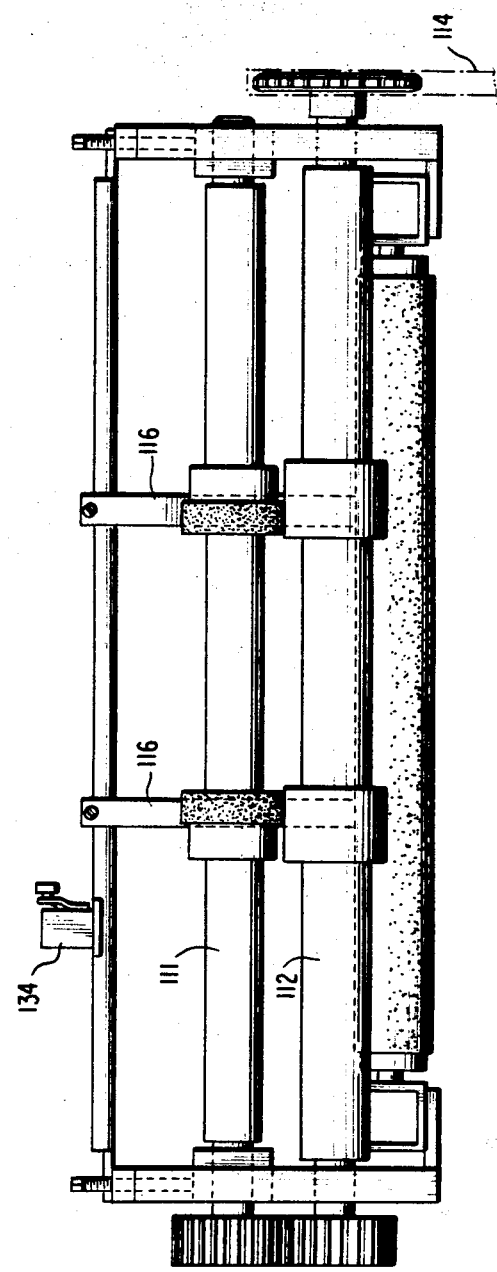
FIG. 7 is a rear elevational view of the out-feed rolls.

The out-feed device 110 is shown in FIGS. 1b, 7 and 8 and includes a pair of out-feed rolls 111 and 112 which are located closely adjacent to the die 100. The rolls 111 and 112 are driven continuously by means of a belt 114 which is in turn driven by a variable speed drive device 115. Variable speed drive device 115 is a conventional piece of equipment and will be well understood by those skilled in the art.

The out-feed rolls 111 and 112 will always be driven so that the surface speed of the rolls 111 and 112 at least equals the linear speed of the web 13 passing beneath the die 100. As the cut piece is pushed past the die 100 by the web 13 behind the cut piece, the leading edge of the cut piece will be engaged by the out-feed rolls 111 and 112 and will be pulled through the out-feed rolls 111 and 112 where it will be engaged by the knock-down springs 116. The knock-down springs 116 will urge the cut piece towards the continuously moving belt 118, the belt 118 being driven from the variable speed drive 119 through a belt 120. The belt 118 passes over the driven roller 121 and over the idler roller 122; also, the belt 118 passes around a tensioning roller 124 which is vertically movable by means of the adjustment 125 so that the belt 118 can be maintained at proper tension.

It is contemplated that the cut pieces will be almost immediately removed from the belt 118 after they are directed there by the knock-down springs 116; however, the pieces can be left to accumulate. If the pieces are not removed from the belt 118, the cut pieces will move down the belt until they reach the stacking pan 126 which includes a substantially horizontal portion 128 with an upwardly sloping portion 129 attached to the forwardmost edge thereof; and, the upwardly sloping portion 129 terminates in a substantially vertical wall 130. It will be seen from FIG. 1b that, as the pieces move up on the stacking pan 126, the force of the additional pieces will cause the cut pieces to move up the upwardly sloped portion 129 so that the group of pieces will tend to set up as shown in FIG. 1b. This positions the cut pieces excellently for subsequent removal of the pieces.

For convenience in using the machine, the out-feed device 110 has flanged wheels 131 which are adapted to ride on a fixed track 132. This arrangement allows the out-feed device 110 to be moved away from the die cutting apparatus 98 for easier access to the die 100 or to other portions of the die cutting device 98. When the out-feed device 110 is moved away from the die cutting device 98, the wheels 131 will remain on the track 132 so that when the out-feed device 110 is again placed adjacent to the die cutting device 98, the alignment will be precise.

Also, there is a switch 134 mounted on the out-feed device 110 adjacent to the movable plate 99. As here shown, the switch 134 includes a feeler 135 which engages the movable plate 99 when the out-feed device 110 is in position to receive cut pieces from the die 100. The switch 134 with its feeler 135 is so arranged that each time the movable plate 99 urges the die 100 against stationary platen 101 the feeler 135 will be moved down to close the switch 134. A simple counter or the like will then allow a determination of how many cycles the machine has made, hence how many pieces have been cut.

OPERATION

From the foregoing description, the operation of the device should now be understandable.

A roll 12 of web is placed on the web delivery means 10, and the guide rollers 21 and 21' are moved against the roll 12 to engage the roll lightly. The web 13 will be passed beneath the guide roller 25 and into the decurling rolls 26. The decurled rolls 26 will then be set appropriately for the proper amount of decurling. The maximum decurl position is shown in full lines in FIGS. 1a and 3 and the minimum decurl position is shown in broken lines in FIG. 1a. It will of course be understood that the decurl rolls 26 can be placed at any intermediate point between these two extremes for the desired amount of decurling.

From the decurl rolls 26, the web 13 passes over the roll 35, through the drag plate 36 and to the continuously driven infeed rolls 38.

It will be realized by those skilled in the art that the decurl rolls 26 will not function to decurl the web 13 if the web 13 is not held tightly around the rolls; therefore, the brake 11 on the web delivery means 10 should be set so that the web between the continuous feed rolls 38 and the brake 11, the web 13 will be held taut.

From the continuous feed roll 38, the web 13 is passed under the dancer roll 55, over the dancer roll 56, and under the dancer roll 58, then over the roll 70 through the hold down 71 and between the collars 75 and 76 of the lateral adjustment means 72. Then the web 13 passes beneath the drag plate 95 and into the intermittent feed device 96.

Though the loop control means 54 can accumulate some of the web 13, it will be realized that there is a very definite limit to the amount of web 13 that the loop control means 54 can accumulate; therefore, it is important that the continuous feed roll 38 be driven at a speed that is commensurate with the amount of web that passes through the intermittent feed device 96. There are numerous ways to time the continuous feed rolls 38 with the intermittent feed rolls 96, but one method contemplated in this invention is the use of an alternator 137 which is driven directly from the motor 102 on the die cutting device 98; and, the output of the alternator 137 is used to drive the motor 49 so that the motor 49 will vary with the speed of the motor 102. Since the intermittent feed rolls 96 are driven by the motor 102 through the linkage 104, it will be seen that the continuous feed roll 38 will remain at a speed that is commensurate with the average speed of the intermittent feed rolls 96.

The web 13 then is fed into the space between the die 100 and the stationary platen 101.

The web 13 should be substantially centered on the machine. When the web 13 is substantially centered, the collar 75 should be moved to allow the web 13 to drag slightly on the collar 75; then, the collar 76 should be moved against the opposite side of the web 13 so that the web 13 will drag lightly against the collar 76. With this arrangement, the web 13 will be carefully held between the collars 75 and 76. Now, if the web 13 is not properly aligned to be struck by the entire die 100, the crank 94 can be rotated to move the plate 82 and cause the shaft 74 with the collars 75 and 76 attached to move transversely which will thereby move the web 13 transversely of the machine to allow better alignment with the die 100.

Before operation of the die cutting device 98, the variable speed drive 115 should be energized so that the out-feed rolls 111 and 112 will be driven, and the variable speed drive 119 should be energized so that the belt 118 will move to carry away the cut pieces. At this point, the machine is ready for operation.

The die cutting apparatus 98 would be turned on which would cause the intermittent feed rolls 96 to begin to feed web 13 into the space between the die 100 and the stationary platen 101. The web 13 would be fed through the continuous feed rolls 38 to maintain a supply of web 13 in the loop control means 54.

As the movable plate 99 descends to cause the die 100 to cut pieces from the web 13, each cut piece will be moved from the area of the die by the web 13 that is urged into the space by the intermittent feed rolls 96. As the cut piece is urged from the area of the die 100, the leading edge of the cut piece will be engaged by the out-feed rolls 111 and 112, and the cut piece will be moved through the out-feed rolls 111 and 112 to engage the knock-down springs 116 and be placed on the belt 118. The belt 118 will be moving continuously to cause the cut pieces to lie on the belt 118 in shingle fashion. Variation of the speed of the belt 118 and the speed of the out-feed rolls 111 and 112 can cause a closer or a more spaced shingling of the cut pieces on the belt 118. Once the cut pieces are on the belt 118, if they are not removed they will simply move forward on the machine to be stacked in the stacking tray 126 for subsequent removal.

It will of course be understood by those skilled in the art that the particular apparatus here presented is by way of illustration only, and is meant to be in no way restrictive; therefore, numerous changes and modifications may be made and the full use of equivalents resorted to without departing from the scope of the invention as defined in the appended claims.

I claim:

1. A die cutting apparatus including delivery means for supporting a roll of web, guide rolls carried by said delivery means and bearing against the sides of the said roll of web, said guide rolls being disposed along a radius of said roll of web, decurl rolls mounted to receive the web from the roll of web, the said decurl rolls comprising a pair of rolls rotatable about a common axis, and locking means to fix the said decurl rolls in a selected position, a first drag plate to frictionally engage the web, continuous feed rolls to receive the web from the said first drag plate, said continuous feed rolls including a driven roll and a mating roll, a synchronous motor for driving said driven roll, said mating roll being driven by said driven rolls, a loop control means to receive web from said continuous feed rolls, said loop control means comprising a plurality of dancer rolls, a pair of bearings carrying each of said dancer rolls, a pair of rods having each of said bearings slidable therealong, said pair of rods being substantially vertically disposed, each of said rods having a spring therearound to bias said bearing in one direction, alternate ones of said dancer rolls being biased in an upward direction and the other of said dancer rolls being biased in a downward direction, a lateral control means adjacent to said loop control means for receiving the web from the said loop control means, said lateral control means including a shaft disposed laterally of the web and immediately below the web, a pair of collars selectively fixable on the said shaft, means for moving the said shaft axially, and hold down means to hold the web between the said collars, a punch press having intermittent feed rolls, drive motor to drive said punch press, said drive motor operating to drive said intermittent feed rolls, a movable plate that is vertically reciprocated by said drive motor, a die, said die being carried by said movable plate, said intermittent feed rolls being located to feed the web beneath the said die, an alternator driven by said drive motor, the output of the said alternator being the input to the said synchronous motor, a discharge device to receive pieces of the web from beneath the said die, said discharge device including a pair of out-feed rolls, drive means for driving said out-feed rolls continuously, a belt aligned with the direction of feed of the web, drive means for driving said belt continuously, knock-down spring to divert said pieces of the web down from the said out-feed rolls to the said belt, and a stacking pan to receive the said pieces of the web from the said belt, said stacking pan including an upwardly sloped portion and a substantially vertical wall contiguous with the said upwardly sloped portion.

2. A die cutting apparatus comprising delivery means for supporting a roll of material, feed rolls arranged to engage a single layer of the material and continuously pull the material from said delivery means as the roll supported by said delivery means unwinds, a pair of decurl rolls for engaging the material as the material passes from its roll toward said feed rolls, said decurl rolls each comprising a roller rotatable about its own longitudinal axis and the rollers being revolvable in unison about a common axis, and locking means for locking said decurl rolls in a fixed position about their common axis of revolution, loop control means for receiving the material from said feed rolls and comprising a plurality of rolls each rotatable about its own axis and at least some of which are movable generally toward or away from each other whereby the loop control rolls constantly contact the material and accommodate varying lengths of the material, punch press means comprising intermittent feed means arranged to receive the material from said loop control means and intermittently feed out a predetermined length of said material, a die movable toward and away from the lengths of the material fed by said intermittent feed means and arranged to cut the material, and means for correlating the feed rolls and the intermittent feed means whereby the feed rolls continuously feed a length of the material to said loop control means which is substantially equal to the amount fed out by said intermittent feed means.

* * * * *